(12) United States Patent
Linck

(10) Patent No.: US 12,117,060 B2
(45) Date of Patent: Oct. 15, 2024

(54) CARBON/CARBON COMPOSITES AND METHODS OF MAKING CARBON/CARBON COMPOSITES HAVING INCREASED FIBER VOLUME

(71) Applicant: GOODRICH CORPORATION, Charlotte, NC (US)

(72) Inventor: John Linck, Pueblo, CO (US)

(73) Assignee: GOODRICH CORPORATION, Charlotte, NC (US)

(*) Notice: Subject to any disclaimer, the term of this patent is extended or adjusted under 35 U.S.C. 154(b) by 47 days.

(21) Appl. No.: 17/392,068

(22) Filed: Aug. 2, 2021

(65) Prior Publication Data

US 2022/0082144 A1 Mar. 17, 2022

Related U.S. Application Data

(60) Provisional application No. 63/078,074, filed on Sep. 14, 2020.

(51) Int. Cl.
*F16D 69/02* (2006.01)
*B29B 11/16* (2006.01)
(Continued)

(52) U.S. Cl.
CPC ............ *F16D 69/023* (2013.01); *B29B 11/16* (2013.01); *C04B 35/83* (2013.01); *B29K 2233/20* (2013.01); *B29K 2307/04* (2013.01)

(58) Field of Classification Search
CPC ........... C04B 35/83; B29B 11/16; D04H 1/46; D04H 1/498; F16D 69/023
See application file for complete search history.

(56) References Cited

U.S. PATENT DOCUMENTS 5,392,500 A * 2/1995 Olry ............... D04H 18/00
28/112
5,952,075 A * 9/1999 Clarke ............ D03D 13/004
428/222

(Continued)

FOREIGN PATENT DOCUMENTS

EP 2264330 12/2010
EP 2309147 4/2011
(Continued)

OTHER PUBLICATIONS

European Patent Office; Extended European Search Report dated Feb. 17, 2022 in Application No. 21196374.9.
(Continued)

*Primary Examiner* — Michael A Tolin
*Assistant Examiner* — Hana C Page
(74) *Attorney, Agent, or Firm* — SNELL & WILMER L.L.P.

(57) ABSTRACT

A method of making a carbonized preform for a carbon-carbon composite brake disk may comprise: stacking a plurality of textile fabric layers, each textile fabric layer in the plurality of textile fabric layers including oxidized polyacrylonitrile (PAN) fibers, each textile fabric layer in the plurality of textile fabric layers being more uniform than a typical fabric layer formed from cross-lapping; each fabric layer being thinner than a typical fabric layer from cross-lapping, needling the plurality of textile fabric layers to form a needled non-woven board; cutting a fibrous preform from the needled non-woven board; and carbonizing the fibrous preform. The resultant non-woven carbonized preform maintains a higher fiber volume and more consistent properties throughout than what would otherwise be achieved using a typical fabric layer from cross-lapping.

5 Claims, 7 Drawing Sheets

(51) Int. Cl.
  *C04B 35/83* (2006.01)
  *B29K 233/20* (2006.01)
  *B29K 307/04* (2006.01)

(56) References Cited

U.S. PATENT DOCUMENTS

| | | | |
|---|---|---|---|
| 6,183,583 B1 * | 2/2001 | Duval | F16D 65/126 |
| | | | 28/107 |
| 6,767,602 B1 * | 7/2004 | Duval | F16D 69/023 |
| | | | 428/36.1 |
| 8,060,997 B2 | 11/2011 | Wall, III et al. | |
| 8,673,188 B2 | 3/2014 | Linck et al. | |
| 9,353,816 B2 | 5/2016 | La Forest et al. | |
| 9,546,438 B2 * | 1/2017 | Fiala | D04H 1/46 |
| 10,457,016 B2 | 10/2019 | La Forest et al. | |
| 2010/0037441 A1 * | 2/2010 | Lescostaouec | B29C 70/24 |
| | | | 28/107 |

FOREIGN PATENT DOCUMENTS

| | | |
|---|---|---|
| EP | 3085823 | 10/2016 |
| GB | 2462534 | 2/2010 |
| WO | 2007136962 | 11/2007 |

OTHER PUBLICATIONS

European Patent Office, European Office Action dated Jan. 23, 2023 in Application No. 21196374.9.

* cited by examiner

CARBON/CARBON COMPOSITES AND METHODS OF MAKING CARBON/CARBON COMPOSITES HAVING INCREASED FIBER VOLUME

CROSS-REFERENCE TO RELATED APPLICATIONS

This application is a non-provisional of, and claims priority to, and the benefit of U.S. Provisional Application No. 63/078,074, entitled "CARBON/CARBON COMPOSITES AND METHODS OF MAKING CARBON/CARBON COMPOSITES HAVING INCREASED FIBER VOLUME," filed on Sep. 14, 2020, which is hereby incorporated by reference in its entirety.

FIELD

The present disclosure relates to carbon/carbon composites, and more specifically, to non-woven preform based carbon/carbon composites having increased fiber volume.

BACKGROUND

Aircraft brake systems typically employ a series of brake disks that, when forced into contact with each other, help to stop the aircraft. The brake disks may comprise a carbon fiber-reinforced/carbon matrix (C/C) composite material. For example, in a brake system, the rotor friction disks, stator friction disks, pressure plates, friction components, and/or end plates may be comprised of C/C composite materials. Rotor friction disks, stator, pressure plate and end plate friction disks comprised of C/C composite materials may exhibit varying wear characteristics, friction coefficients, and vibration profiles resulting in part from the materials used to construct the C/C composite materials and the heat treatments to which the C/C composite materials are exposed.

SUMMARY

A method of making a carbonized preform for a carbon-carbon composite brake disk is disclosed. The method may comprise: stacking a plurality of textile fabric layers, each textile fabric layer in the plurality of textile fabric layers including oxidized polyacrylonitrile (PAN) fibers, each textile fabric layer in the plurality of textile fabric layers being thinner and more uniform than a typical non-woven fabric layer formed from cross-lapping; needling the plurality of textile fabric layers to form a needled non-woven textile board; cutting a fibrous preform from the needled non-woven textile board; and carbonizing the fibrous preform.

In various embodiments, needling the plurality of textile fabric layers includes needling between 0 and 50 penetrations/cm². Needling the plurality of textile fabric layers may include needling between 0 and 20 penetrations/cm². Cutting the fibrous preform may further comprise a plurality of fibrous preforms from the needled non-woven textile board. Carbonizing the fibrous preform may further comprise carbonizing the plurality of fibrous preforms. The plurality of fibrous preforms may be more uniform relative to a typical plurality of fibrous preforms formed from a cross-lapping process. Carbonizing the plurality of fibrous preforms may create a plurality of carbonized preforms having a lower standard deviation of local areal weight, relative to a typical non-woven carbonized preform. Each textile fabric layer in the plurality of textile fabric layers may have a lower standard deviation of local areal weight, than the typical fabric layer formed from cross-lapping. Each textile fabric layer in the plurality of textile fabric layers may be a non-crimp, multi-axial stitch bonded fabric. Each textile fabric layer in the plurality of textile fabric layers may have a first average thickness less than a second average thickness of the typical fabric layer.

A method of making a carbon-carbon composite is disclosed herein. The method may comprise: stacking a plurality of textile fabric layers, each textile fabric layer in the plurality of textile fabric layers including oxidized polyacrylonitrile (PAN) fibers, each textile fabric layer in the plurality of textile fabric layers being a non-crimp, multi-axial stitch-bonded fabric; needling the plurality of textile fabric layers to form a needled non-woven textile board; cutting a fibrous preform from the needled non-woven board; carbonizing the fibrous preform; and densifying the fibrous preform with a carbon matrix.

In various embodiments, needling the plurality of textile fabric layers includes needling between 0 and 50 penetrations/cm'. Needling the plurality of textile fabric layers may include needling between 0 and 20 penetrations/cm'. Each textile fabric layer in the plurality of textile fabric layers may have a first average thickness less than a second average thickness of a typical fabric layer formed from cross-lapping. Each textile fabric layer in the plurality of textile fabric layers may have a lower standard deviation of local areal weight than a typical fabric layer formed from cross-lapping. The method may further comprise forming each textile fabric layer in the plurality of textile fabric layers from a fiber placement process. Cutting the fibrous preform may further comprise a plurality of fibrous preforms from the needled non-woven textile board. Carbonizing the fibrous preform may further comprise carbonizing the plurality of fibrous preforms. The plurality of fibrous preforms may be more uniform relative to a typical plurality of fibrous preforms formed from a cross-lapping process. Carbonizing the plurality of fibrous preforms may create a plurality of carbonized preforms having a lower standard deviation of local areal weight relative to a typical carbonized non-woven preform.

A method of making a plurality of carbon-carbon composite brake disks is disclosed herein. The method may comprise: needling each textile fabric layer in a plurality of textile fabric layers between 0 and 50 penetrations/cm²; stacking a plurality of textile fabric layers, each textile fabric layer in the plurality of textile fabric layers including pre-oxidized polyacrylonitrile (PAN) fibers, each textile fabric layer in the plurality of textile fabric layers being a non-crimp, multi-axial stitch-bonded fabric; cutting a plurality of fibrous preforms from the needled non-woven board; carbonizing the plurality of fibrous preforms without using compression weights; densifying of the plurality of fibrous preforms using chemical vapor infiltration (CVI); and heat treating the plurality of fibrous preforms.

In various embodiments, each textile fabric layer in the plurality of textile fabric layers may have a lower standard deviation of local areal weight than a typical fabric layer formed from cross-lapping. The method may further comprise forming each textile fabric layer in the plurality of textile fabric layers from a fiber placement process. The plurality of fibrous preforms may be more uniform relative to a typical plurality of fibrous preforms formed from the cross-lapping process. A first standard deviation of fiber volume ratio for the plurality of fibrous preforms after carbonization may be lower than a typical standard deviation of fiber volume ratio for a typical plurality of fibrous preforms formed from the cross-lapping process.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
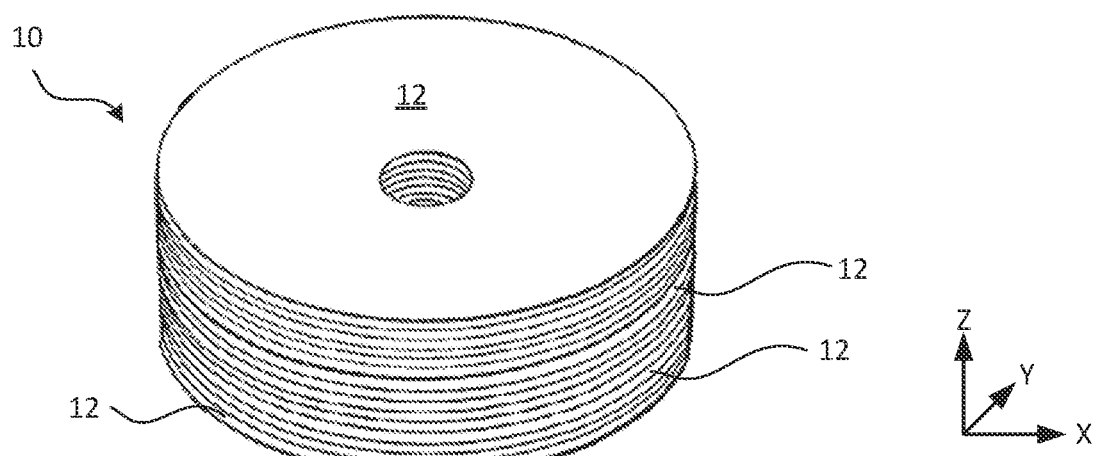
FIG. 1 illustrates a fibrous preform, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Provided herein, according to various embodiments, is a manufacturing system(s) and associated method(s) for fabricating C/C composite materials and/or components in a more ergonomically beneficial and higher furnace capacity manner while maintaining beneficial C/C composite material properties. While numerous details are included herein pertaining to aircraft components, such as brake components, the manufacturing system(s) and method(s) disclosed herein can be applied to fabricate other carbon fiber-reinforced ceramic matrix composite components.

Referring now to FIG. 1, a fibrous preform 10 is illustrated, in accordance with various embodiments. Fibrous preform 10 may comprise a porous structure comprised of a plurality of stacked textile layers 12. A porous structure may comprise any structure derived from a fibrous material such as oxidized polyacrylonitrile (PAN), carbon fibers or the like. In various embodiments, the carbon fibers may be derived from polyacrylonitrile (PAN), rayon (synthetic fiber derived from cellulose), oxidized polyacrylonitrile fiber (OPF), or the like. The starting fiber may be oxidized PAN. In various embodiments, a starting fiber for a manufacturing system and method as described herein, includes a oxidized PAN fiber.

Figure 2:
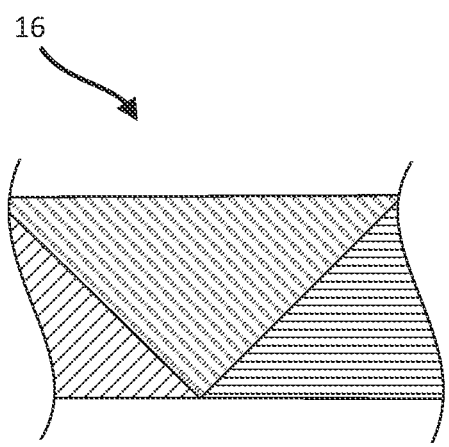
FIG. 2 illustrates a textile fabric for forming a fibrous preform, in accordance with various embodiments.

Referring now to FIG. 2, a textile fabric 16 used to manufacture the plurality of stacked textile layers 12 from FIG. 1 is illustrated, in accordance with various embodiments. The textile fabric is a non-crimp, multi-axial, stitch-bonded fabric. The non-crimp, multi-axial stitch-bonded fabric of the textile fabric 16 may be manufactured from oxidized PAN fiber, as described further herein. "Non-crimp," as disclosed herein, refers to multiple layers of unidirectional, non-woven fibers, with each ply placed in a different orientation (i.e. multi-axial) or axis. "Stitch-bonded," as described herein, refers to a process of consolidating fiber webbing (e.g., oxidized PAN fiber webbing), with knitting elements to hold the fibers in alignment.

In various embodiments, with brief reference to FIG. 1, each textile layer in the plurality of textile layers 12 of the fibrous preform 10 are more uniform than typical textile preforms. "Uniform," as disclosed herein refers to a lower standard deviation in local areal weight and fiber orientations of the textile layer among the textile preform relative to a typical standard deviation in local area weight of a typical textile layer of a typical fibrous non-woven preform made using a cross-lapped textile fabric. Additionally, "areal weight" as described herein refers to the weight of a fiber per unit area of a textile. For example, in various embodiments, a typical textile fabric, formed via cross-lapping, may include an average local areal weight of approximately 1010 kg/m$^2$ with a standard deviation of approximately 73 kg/m$^2$, whereas an areal weight of the textile fabric 16, as described herein, may include an average local areal weight of approximately 1020 kg/m$^2$ with a standard deviation of approximately 54 kg/m$^2$ when approximately 72 local areal weights of a textile fabric of the same sizes are measured. In this regard, as mentioned above, the textile fabric 16 is more uniform than a typical textile fabric formed via cross-lapping. Thus, each textile layer in the plurality of textile layers 12 of the fibrous preform 10 from FIG. 1 are more uniform than a typical non-woven textile preform formed with typical textiles. In the example outlined above, the textile layer would be approximately 27% more uniform than a typical textile layer.

In various embodiments, each textile layer from the plurality of textile layers may include a quasi-istropoic 0°, approximately +60°, approximately −60° architecture. Other architectures/fiber orientations are also possible including 0°, +45°, −45°, 90° and the like. Approximately, refers to +/−2° from the target fiber direction.

In various embodiments, the textile fabric 16 may be thinner than a typical textile layer in a typical non-woven fibrous preform. For example, the textile fabric 16 may comprise an average thickness of approximately 0.061 inches (0.155 cm) compared to a typical textile fabric having an average thickness of approximately 0.071 inches (0.180 cm) when formed via cross-lapping. In various embodiments, by having thinner, more uniform, textile layers relative to a typical textile layer, a greater fiber volume ratio for a fibrous preform 10 from FIG. 1 may be achieved prior to carbonization. In this regard, a step where weights are placed on a typical fibrous preform during carbonization may be eliminated with the fibrous preform 10 from FIG. 1 and result in a similar or greater fiber volume ratio for a resultant carbonized preform relative to a typical non-woven carbonized preform. As used herein, "fiber volume ratio" means the ratio of the volume of the fibers of the fibrous preform to the total volume of the fibrous preform. For example, a fiber volume ratio of 25% means the volume of the fibers in the fibrous preform is 25% of the total volume of fibrous preform. In various embodiments, prior to carbonization, fibrous preform 10 comprises a fiber volume ratio of 40% or greater. In various embodiments, prior to carbonization, fibrous preform 10 comprises a fiber volume ratio between 40% and 60%.

In various embodiments, higher fiber volume ratio may produce a lower carbon wear rate and/or a higher rejected take-off (RTO) friction coefficient. Fiber volume ratios may be increased by applying higher needling levels during textile preform fabrication of typical textile layers; however, higher needling may negatively impact mechanical properties and high energy friction coefficients, including RTO friction coefficient. In accordance with various embodiments, the textile fabric 16 may enable a fiber volume ratio equal to or greater than typical C/C brake disks with reduced needling, resulting in greater mechanical properties and/or high energy and RTO friction coefficient relative to typical C/C brake disks.

In various embodiments, the textile fabric 16 may be manufactured from a fiber placement process, as opposed to a typical cross-lapping process. In various embodiments, the fiber placement process may include an automated composite manufacturing process of heating and compacting the oxidized PAN fiber, as described previously herein. In various embodiments, the textile fabric 16 may be manufactured from the fiber placement process utilizing an oxidized PAN fiber tow comprising approximately 320,000 filaments (or a 320K tow), in accordance with various embodiments. In various embodiments, the textile fabric 16 formed from the fiber placement process may be pre-needled prior to stacking (as will be described further herein). For example, the textile fabric 16 may be pre-needled between 0 and 50 penetrations/cm$^2$, or between 0 and 30 penetrations/cm$^2$, or between 0 and 20 penetrations/cm$^2$. In this regard, since the textile fabric 16 is more uniform and thinner than typical textile fabrics, the textile fabric 16 may be pre-needled less than typical textile fabrics. For example, typical textile fabrics may be pre-needled at greater than 50 penetrations/cm$^2$.

Prior to forming the fibrous preform 10 from FIG. 1, a needled non-woven textile board may be formed by needling a plurality of stacked textile layers, each textile layer including the textile fabric 16 from FIG. 2. Needling the textile layers of the needle board tends to push fibers from one layer to the next layer, thereby forming z-fibers that extend perpendicularly across the layers. Needling pulls fibers from the in-plane direction and forces them into the z-fiber direction. After needling, the needles non-woven textile board may comprise fibers extending in three different directions (i.e., in the x and y directions and the z direction).

Figure 3:
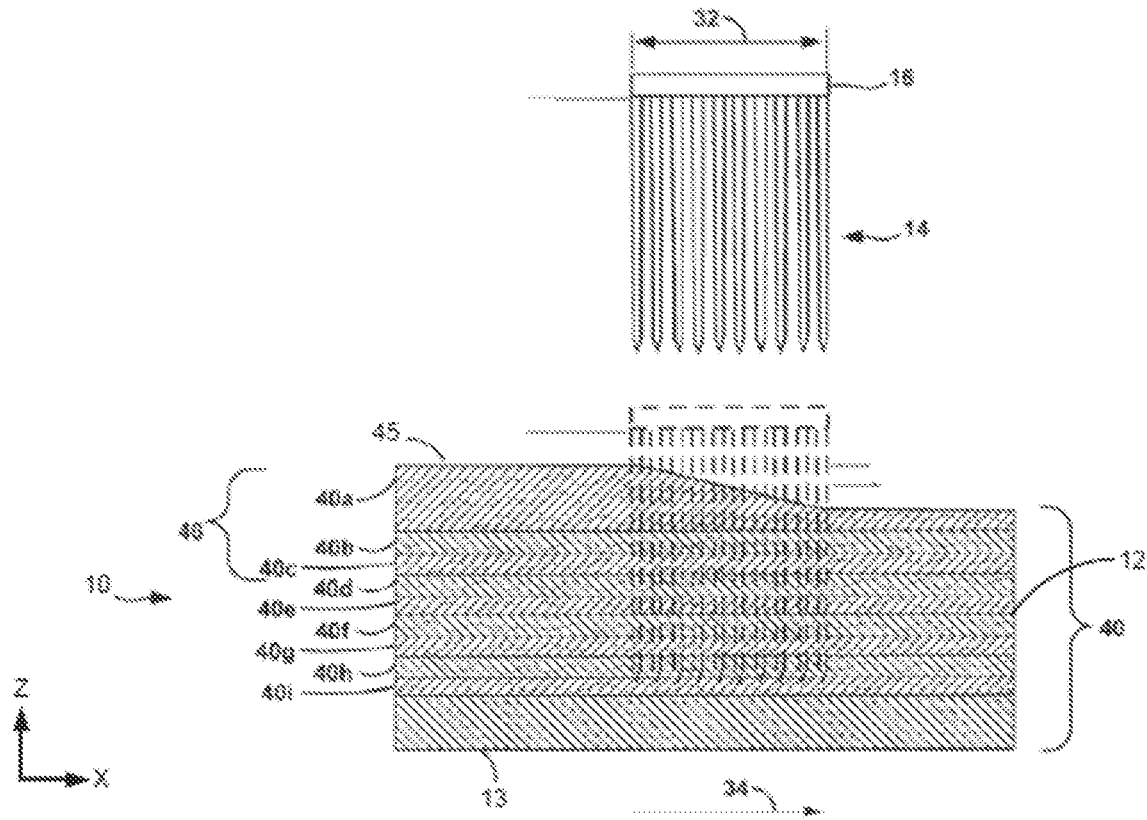
FIG. 3 illustrates a needling process of a plurality of stacked textile fabrics, in accordance with various embodiments.
Figure 4:
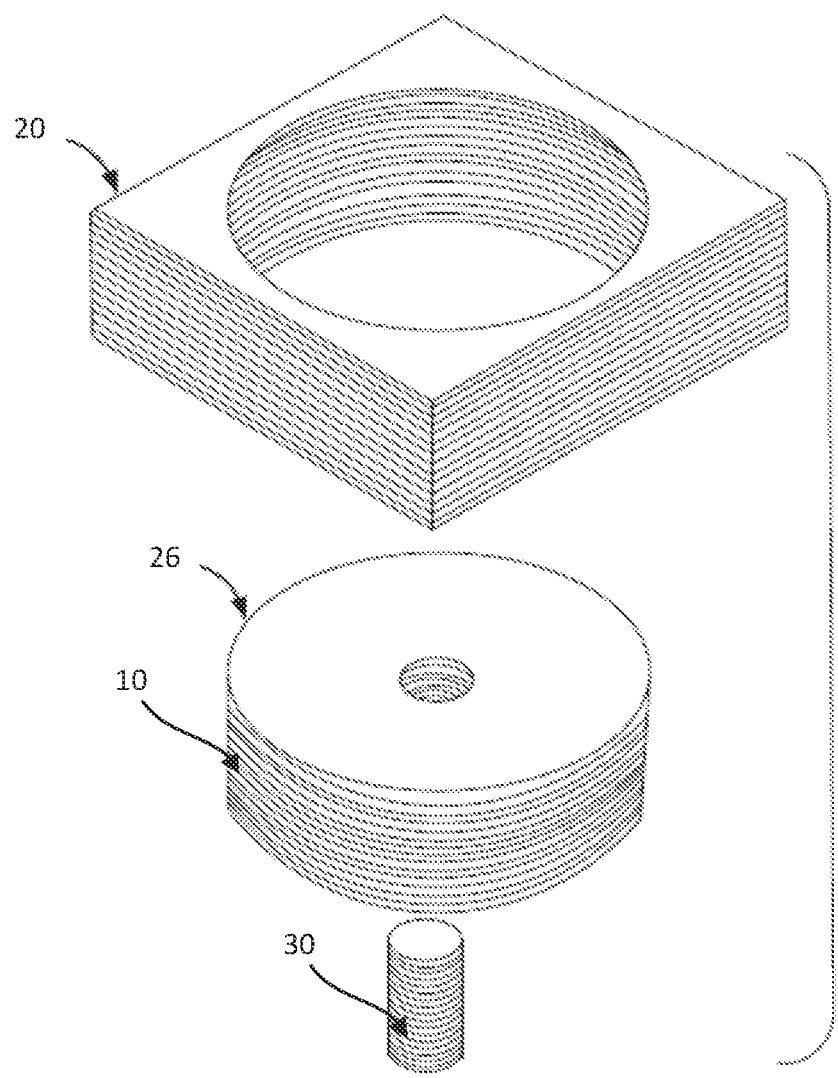
FIG. 4 illustrates a fibrous preform cut from a needled non-woven board, in accordance with various embodiments.

For example, as shown in FIG. 3, stacked textile layers 12 during manufacturing of a fibrous preform 10 from FIG. 1, in accordance with various embodiments, is illustrated. The stacked textile layers 12 comprise at least two textile fabric layers 40a-40i is disposed beneath the multitude of felting needles 14 on support 13. The textile fabric layers 40a-40i are in accordance with textile fabric 16 from FIG. 2. As depicted, the fibrous preform 10 may comprise a multitude of textile layers 12. The direction of alignment of the at least one additional textile fabric layer may be at an angle between approximately 45 and 90 degrees to the machine direction. The superposing may comprise superposing at least two additional textile fabric layers with the first textile fabric layer at two separate acute angles to the machine direction. The first textile fabric layer may be needled prior to the superposing with the at least one additional textile fabric layer.

A top layer 40a is disposed over lower adjacent layers 40b, 40c, 40d, 40e, 40f, 40g, 40h, and 40i with the top layer 40a defining an exposed surface 45. In this example, top layer 40a is not adhered to layer 40b until it is subjected to a needling pass in which layers 40a-40i are passed beneath the multitude of felting needles 14 while the multitude of felting needles 14 are repeatedly driven through the exposed surface 45 into the fibrous preform 10, as shown in phantom, deep enough to permanently transport fiber from layer 40a into lower adjacent layer 40b. The needling pass adheres top layer 40a to layer 40b by permanently transporting fiber from the top layer 40a into layer 40b and other lower adjacent layers.

Fiber is permanently transported from a chosen set of layers for each needling pass. The set of layers may change from one needling pass to the next. Choosing the set of layers is a matter of preform design according to desired final preform properties. The set of layers includes at least the top layer 40a. According to various embodiments, the set of layers preferably includes the top layer 40a and at least one adjacent layer 40b. In another embodiment, the set of layers preferably includes the top layer 40a and at least two adjacent layers 40b and 40c. In the example shown, layers could include more than three layers in many applications.

In various embodiments, needling in accordance with FIG. 3 may include needling the stacked textile layers between 50 and 81 penetrations/cm$^2$. As stated previously, the decrease in needling may positively impact the mechanical properties of the resultant C/C brake disks and high energy friction coefficients, including RTO friction coefficient. In various embodiments, the use of the textile fabric 16, which includes greater compaction relative to typical textile fabrics formed via cross-lapping, may enable carbonizing a fibrous preform with no needling, resulting in a greater fiber volume ratio.

Figure 6:
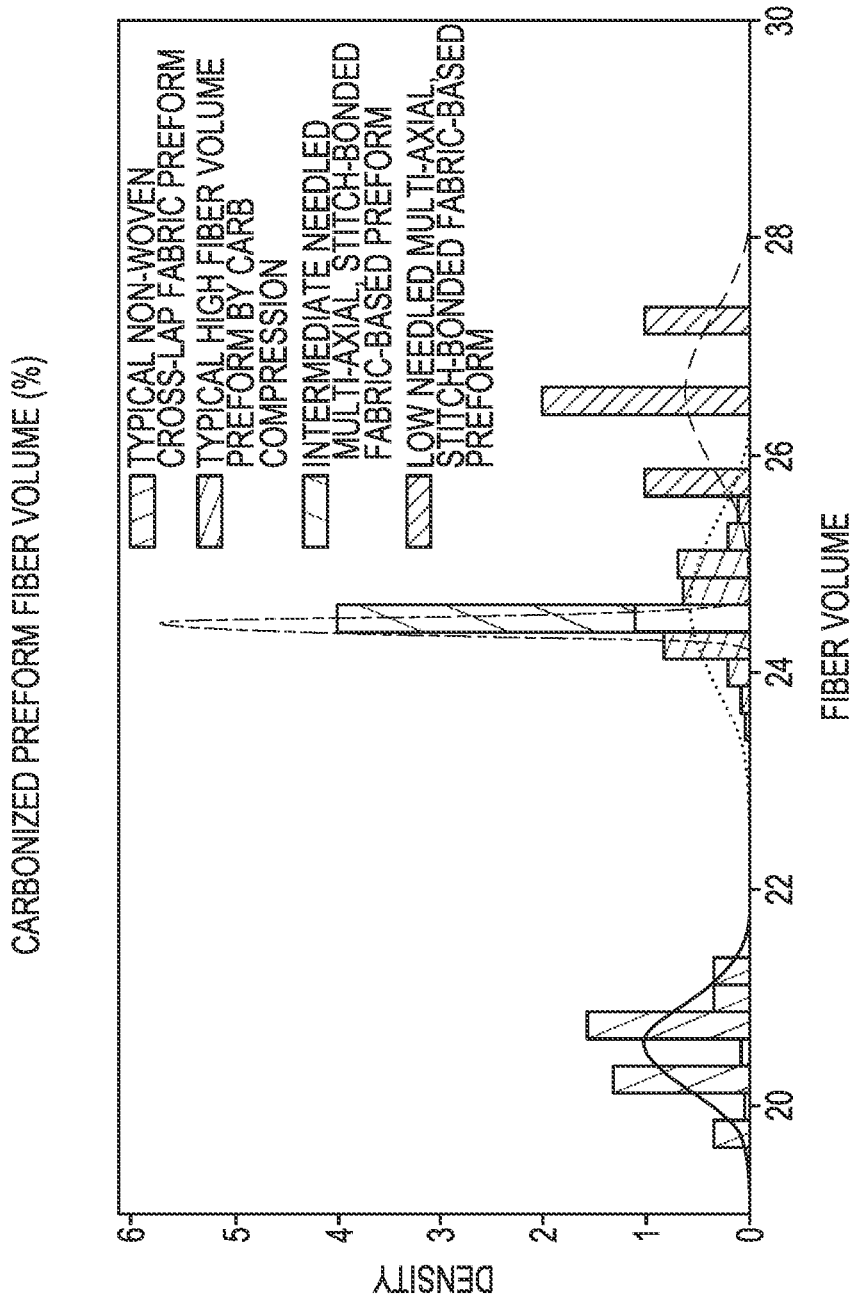
FIG. 6 illustrates the influence of needling the multi-axial, non-crimp, stitch-bonded fabric on carbonized preform fiber volume.
Figure 8:
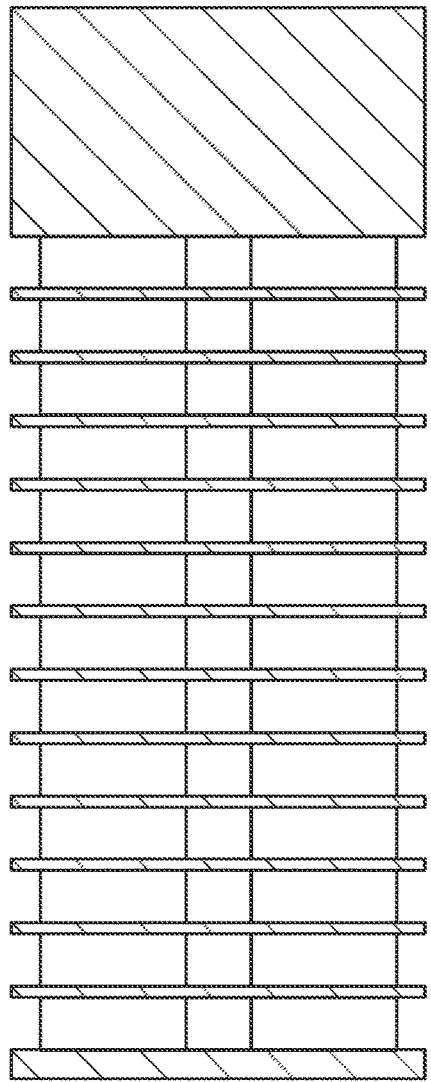
FIG. 8 illustrates typical fibrous preforms stacked for carbonization with weights, in accordance with various embodiments.
Figure 8:
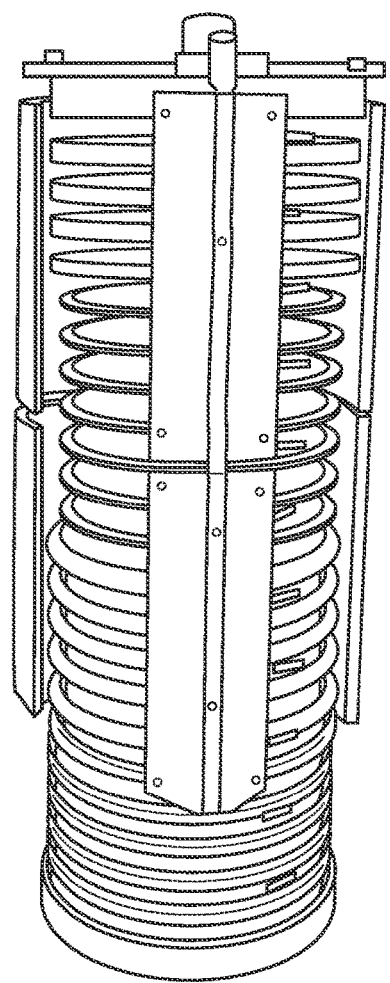

In various embodiments, the greater uniformity and compaction of the textile fabric 16 may enable a more uniform preform after carbonization, with similar or greater fiber volume ratio relative to typical non-woven carbonized preforms formed with typical textiles and weights or other preform loading methods to facilitate compaction during carbonization. For example, carbonizing a fibrous preform in accordance with fibrous preform 10 without weights or other external means of compression and the same amount of pre-needling as a typical fibrous preform formed from cross-lapping may result in carbonized preforms with an average fiber volume ratio of 20.6% and a standard deviation of 0.39% (e.g., as shown in FIG. 6). In various embodiments, a fibrous preform produced in accordance with the proposed method may result in a carbonized preform with an average fiber volume of 24.5% or greater without the use of weights or other means of compression during carbonization. In contrast, the typical fibrous preform formed from cross-lapping and carbonized with weights (FIG. 8) may produce an average fiber volume ratio of 24.6% or greater and a standard deviation of 0.7% (e.g., as shown in FIG. 6). Thus, with the same amount of stacked layer needling, the variation of carbonized preform fiber volume ratio may be approximately 10 times greater (i.e., 0.07% variation vs.

0.7% variation) than the variation of typical non-woven carbonized preforms where textiles formed from cross-lapping are utilized.

In various embodiments, the greater uniformity and compaction of the textile fabric 16 may enable a greater fiber volume ratio after carbonization, with similar variation in fiber volume ratio to typical non-woven carbonized preforms formed with typical textiles and weights or other loading methods to facilitate compaction during carbonization. For example, carbonizing a fibrous preform in accordance with fibrous preform 10 without weights and the no needling prior to carbonization, relative to a typical fibrous preform formed from cross-lapping and having typical needling of 51 penetrations/cm$^2$ prior to carbonization, may result in carbonized preforms with an average fiber volume ratio of 24.4% and a standard deviation of 0.07% or fiber volume ratio 26.6% and a standard deviation of 0.62%. Higher fiber volumes and/or lower standard deviations are possible. In contrast, the typical fibrous preform formed from cross-lapping and carbonized with weights may produce an average fiber volume ratio of 24.6%, or higher, and a standard deviation of 0.7%, as outlined above. Thus, without pre-needling, the fiber volume ratio may be increased, but the variation of carbonized preform fiber volume ratio may be similar to the variation of typical non-woven carbonized preforms where textiles formed from cross-lapping are utilized.

As shown in FIG. 3, after all of the textile fabric layers 40a-40i have been placed on the stacked textile layers 12 and a needle board 20 is formed, the stacked textile layers 12 has been needled, an annulus 26 may be cut from the needle board 20. An additional annulus 30 may be cut from the annulus 26 forming the fibrous preform 10 from FIG. 1. The resulting fibrous preform 10 is substantially composed of oxidized PAN fibers extending in three or more directions through the fibrous preform 10 and pores, or open spaces, extending therethrough. In various embodiments, no other materials are used in forming the fibrous preform 10, such as resins or the like. In addition, the fibrous preform 10 is formed without applying any compressive pressure to the fibrous preform 10 during carbonization, other than the pressure that is applied by the needles 14 during needling and the weight of preforms stacked on top during carbonization.

In various embodiments, fibrous preforms 10 may be placed in a furnace for carbonization. The carbonization process may be employed to convert the fibers of the fibrous preforms 10 into pure carbon fibers, as used herein only "pure carbon fibers" means carbon fibers comprised of at least 99% carbon. The carbonization process is distinguished from the densification process described below in that the densification process involves infiltrating the pores of the fibrous preform 10 and depositing a carbon matrix within and around the carbon fibers of the fibrous preform, and the carbonization process refer to the process of converting the fibers of the fibrous preform 10 into pure carbon fibers.

Figure 7:
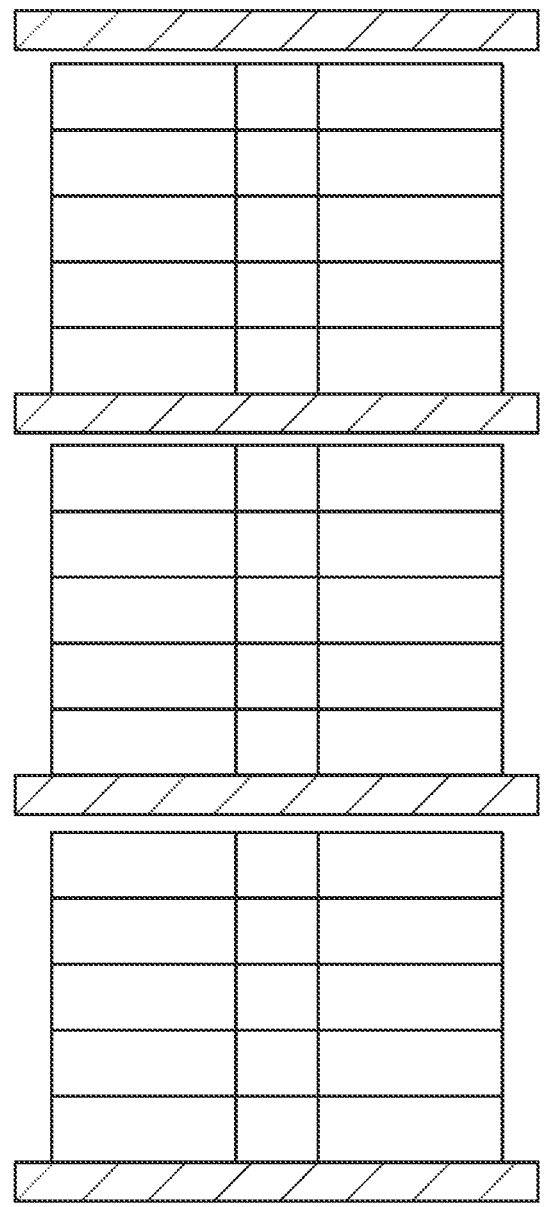
FIG. 7 illustrates the fibrous preforms stacked for carbonization in a furnace, in accordance with various embodiments.

In various embodiments, the fibrous preforms 10 may be stacked in the furnace without the additional use of weights as shown in FIG. 7. In this regard, due to the material properties of the textile fabric 16 manufactured via a fiber placement process, each fibrous preform 10 may have a fiber volume ratio of greater than 40%, or between 40% and 60% prior to densification.

In various embodiments, after carbonization, fibrous preform 10 comprises a fiber volume of 25% or greater. In various embodiments, after carbonization, fibrous preform 10 comprises a fiber volume of between 23% and 30%. In various embodiments, after carbonization, fibrous preform 10 comprises a fiber volume of between 26% and 28%.

After carbonization, fibrous preforms 10, may be densified using CVI, as described in further detail below. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases (e.g., at least one of methane, ethane, propane, butane, and/or the like, as described herein) into the furnace and around and through the fibrous preforms. In various embodiments, the CVI/CVD process may include a temperature gradient. In various embodiments, the CVI/CVD process may include a pressure gradient. As used herein, CVI/CVD may refer to chemical vapor infiltration or chemical vapor deposition. Accordingly, CVI/CVD may refer to chemical vapor infiltration or deposition.

CVI/CVD densification may be conducted in a vacuum or partial vacuum (e.g., at pressures of 1-15 torr) or in an inert atmosphere at a temperature in the range from about 900° C. to about 1100° C. (1,652° F. to about 1,832° F.), and in various embodiments in the range of up to about 1,000° C. (1,832° F.) (wherein the term about in this context only means+/−100° C.) for a period of time in the range from about 150 hours to about 550 hours, and in various embodiments, in the range from about 300 hours to about 500 hours (wherein the term about in this context only means+/−24 hours).

As a result, carbon from the hydrocarbon gases separates from the gases and is deposited on and within the fibrous preforms. Typically, the densification process is continued until the preform reaches a density in the range from 1.6 to 1.9 grams per cubic centimeter (g/cc), and in various embodiments, a density of approximately 1.75 g/cc. When the densification step is completed, the resulting C/C part has a carbon fiber structure with a carbon matrix infiltrating the fiber structure, thereby deriving the name "carbon/carbon."

Following the CVI/CVD densification process, the C/C part may undergo a final heat treatment (FHT) process. This may be done using the same furnace used for densification or a different furnace. If done using the same furnace, the flow of hydrocarbon gases would be stopped following the end of the densification process and the temperature increased. FHT may be conducted in a vacuum or partial vacuum (e.g., at pressures of 1-15 torr) or in an inert atmosphere at a temperature in the range from about 1200° C. to about 2600° C. (2,192° F. to about 4,712° F.), and in various embodiments in the range from about 1400° C. to about 2200° C. (2,552° F. to about 3,992° F.) (wherein the term about in this context only means+/−100° C.) for a period of time in the range from about 4 hours to about 14 hours, and in various embodiments, in the range from about 8 hours to about 12 hours (wherein the term about in this context only means+/−2 hours). The FHT process may decrease the hardness of the C/C part. In various embodiments, the FHT process may increase the coefficient of friction of the C/C part. In various embodiments, the FHT process may decrease the wear life of the C/C part.

Figure 5:
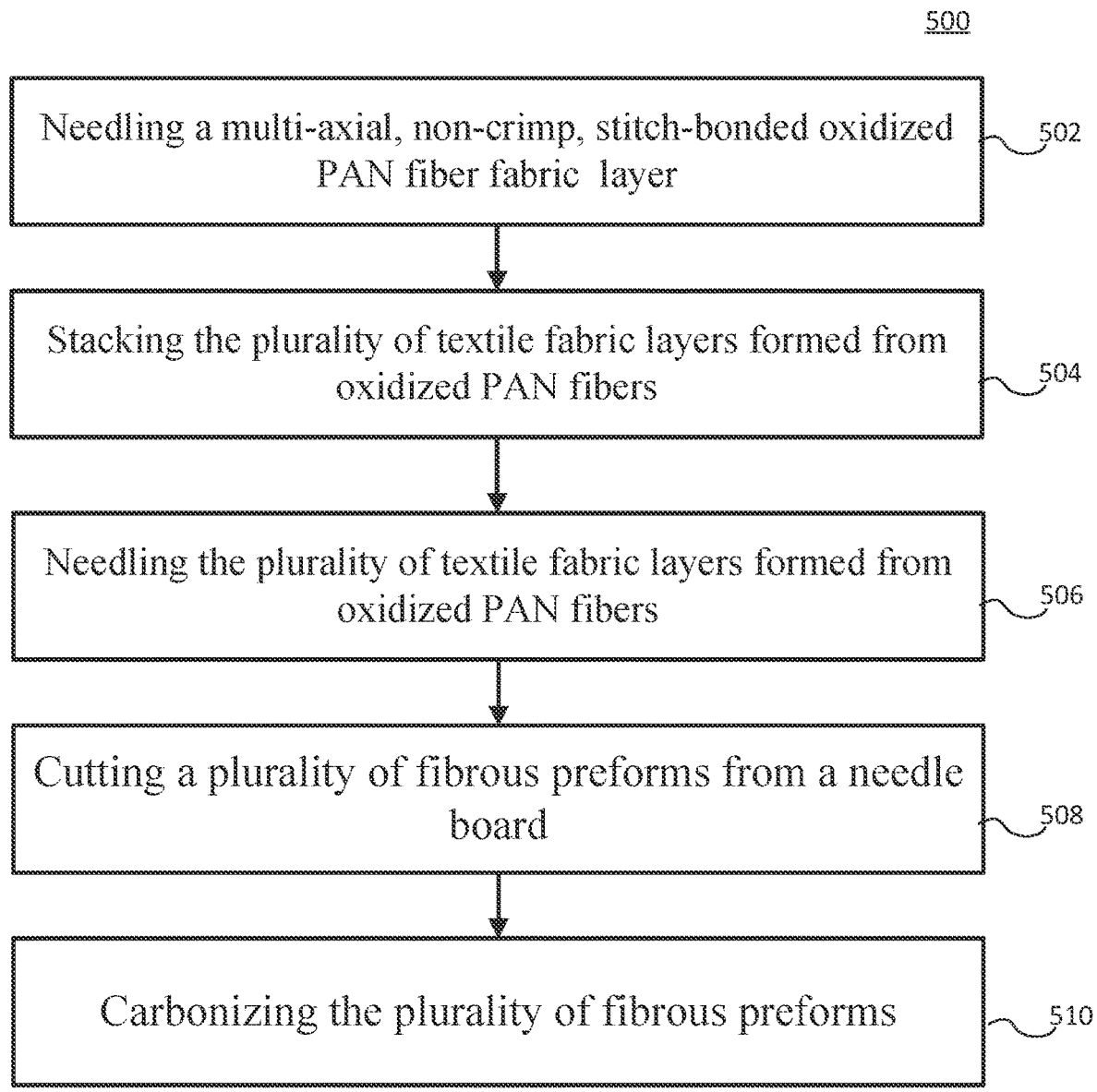
FIG. 5 illustrates a method of forming a carbonized preform, in accordance with various embodiments.

With reference to FIG. 5, a method 500 for making a carbonized preform is shown, in accordance with various embodiments. Method 500 may comprise needling each multi-axial, non-crimp, stitch-bonded oxidized PAN fiber fabric layer in a plurality of PAN fiber fabric layers (step 502). The plurality of PAN fiber fabric layers may be in accordance with the textile fabric 16 from FIG. 2. In various embodiments, each textile fabric layer in the plurality of textile fabric layers may be pre-needled between 0 and 50 penetrations/cm², or between 0 and 30 penetrations/cm², or between 0 and 20 penetrations/cm². In various embodiments, each textile fabric layer may have greater uniformity and a lower average thickness relative to typical textile fabric layers for use in C/C brake disk fabrication. The method 500 may further comprise stacking a plurality of textile fabric layers (Step 504). In various embodiments, the method 500 further comprises needling the plurality of textile fabric layers (step 506). In various embodiments, steps 504 and step 506 may be formed simultaneously. In various embodiments, needling the plurality of textile fabric layers may be between 50 and 81 penetrations/cm'.

In various embodiments, after the needling step of the plurality of stacked textile fabric layers (e.g., step 506), a needled non-woven board may be formed. The method 500 may further comprise cutting a plurality of fibrous preforms from the needle board (step 508) and carbonizing the plurality of fibrous preforms (step 510). In various embodiments, the carbonizing step may occur without adding weights to the fibrous preforms to compress the preforms. In various embodiments, C/C brake disk manufacturing process include adding weights to the fibrous preforms prior to carbonization. In this regard, the weights of typical system further compact the fibrous preforms during carbonization. The weights are added to enhance the fiber volume ratio of the typical carbonized fiber preform relative to a process without the weights. In various embodiments, a fiber volume ratio equal to, or greater than, a fiber volume ratio achieved with weights on typical fibrous preforms from carbonization may be achieved by the method 500 disclosed herein. In this regard, in various embodiments, the method 500 provides an ergonomic benefit, reduced time and cost of manufacturing, and an enhanced carbonized preform.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of making a carbon-carbon composite, comprising:
consolidating each of a plurality of oxidized polyacrylonitrile (PAN) fiber webbing with knitting elements to form a plurality of textile fabric layers, each of the plurality of textile fabric layers being a consolidated non-crimp, multi-axial stitch bonded fabric layer, the consolidated non-crimp, multi-axial stitch bonded fabric for each of the plurality of textile fabric layers including less than or equal to 20 needle penetrations/cm², each of the plurality of textile fabric layers being thinner and more uniform relative to a cross-lapped textile fabric layer formed by cross-lapping the plurality of oxidized polyacrylonitrile (PAN) fiber webbing;

stacking the plurality of textile fabric layers to form a stacked textile fabric board;

needling, between 50 and 81 penetrations/cm$^2$, the stacked textile fabric board to form a needled non-woven board;

cutting a fibrous preform from the needled non-woven board;

carbonizing the fibrous preform without weights to form a carbonized preform; and densifying the fibrous preform with a carbon matrix.

2. The method of claim 1, further comprising forming each textile fabric layer in the plurality of textile fabric layers from a fiber placement process.

3. The method of claim 1, wherein:

cutting the fibrous preform further comprises a plurality of fibrous preforms from the needled non-woven board, and carbonizing the fibrous preform further comprises carbonizing the plurality of fibrous preforms.

4. A method of making a plurality of carbon-carbon composite brake disks, comprising:

consolidating each of a plurality of oxidized polyacrylonitrile (PAN) fiber webbing with knitting elements to form a plurality of consolidated textile fabric layers without cross-lapping, each of the plurality of consolidated textile fabric layers being a consolidated non-crimp, multi-axial stitch bonded fabric layer;

needling each of the plurality of consolidated textile fabric layers without cross-lapping to less than or equal to 20 penetrations/cm$^2$ to form a plurality of non-cross-lapped consolidated textile fabric layers, each of the plurality of non-cross-lapped consolidated textile fabric layers being thinner and more uniform relative to a cross-lapped textile fabric layer formed by cross-lapping the plurality of oxidized polyacrylonitrile (PAN) fiber webbing; subsequently stacking the plurality of non-cross-lapped consolidated textile fabric layers to form a stacked textile fabric board; subsequently needling, between 50 and 81 penetrations/cm$^2$, the stacked textile fabric board to form a needled non-woven board;

cutting a plurality of fibrous preforms from the needled non-woven board;

carbonizing the plurality of fibrous preforms without using compression weights to form a carbonized preform;

densifying the carbonized preform using chemical vapor infiltration (CVI); and heat treating the carbonized preform.

5. The method of claim 4, further comprising forming each of the plurality of consolidated textile fabric layers from a fiber placement process.

* * * * *